United States Patent
Özsüt

(10) Patent No.: US 9,611,172 B2
(45) Date of Patent: Apr. 4, 2017

(54) LOWER HEAT PROCESSED CALCIUM SULPHATES FOR EARLY STRENGTH CEMENTS AND GENERAL USE

(71) Applicant: Mustafa Özsüt, Ankara (TR)

(72) Inventor: Mustafa Özsüt, Ankara (TR)

( * ) Notice: Subject to any disclaimer, the term of this patent is extended or adjusted under 35 U.S.C. 154(b) by 0 days.

(21) Appl. No.: 14/768,759

(22) PCT Filed: Feb. 18, 2014

(86) PCT No.: PCT/TR2014/000037
§ 371 (c)(1),
(2) Date: Aug. 18, 2015

(87) PCT Pub. No.: WO2014/129992
PCT Pub. Date: Aug. 28, 2014

(65) Prior Publication Data
US 2016/0002106 A1 Jan. 7, 2016

(30) Foreign Application Priority Data

Feb. 18, 2013 (TR) ............... a 2013 01904
Mar. 22, 2013 (TR) ............... a 2013 03508
Dec. 13, 2013 (WO) ............ PCT/TR2013/000384

(51) Int. Cl.
| | | |
|---|---|---|
| C04B 11/02 | (2006.01) | |
| C04B 7/52 | (2006.01) | |
| C04B 11/00 | (2006.01) | |
| C04B 11/05 | (2006.01) | |
| C04B 11/28 | (2006.01) | |
| C04B 11/30 | (2006.01) | |

(52) U.S. Cl.
CPC ............... *C04B 11/02* (2013.01); *C04B 7/52* (2013.01); *C04B 11/002* (2013.01); *C04B 11/05* (2013.01); *C04B 11/28* (2013.01); *C04B 11/30* (2013.01)

(58) Field of Classification Search
CPC ......... C04B 7/52; C04B 11/002; C04B 11/02; C04B 11/05; C04B 11/28; C04B 11/30
See application file for complete search history.

(56) References Cited

U.S. PATENT DOCUMENTS 2,848,210 A * 8/1958 Compton ............ C04B 11/0285
    34/109
4,213,931 A * 7/1980 Trutnev ................ C04B 28/141
    106/783
4,309,391 A * 1/1982 O'Neill ................. C04B 11/032
    106/740
5,169,617 A * 12/1992 Clemens ................ C04B 11/05
    106/705
6,730,162 B1 * 5/2004 Li ........................... C04B 28/14
    106/695

FOREIGN PATENT DOCUMENTS

DE      10333361 A1       2/2005
JP      2011-163644 A  *  6/2001
SU         481561 A    *  10/1975

OTHER PUBLICATIONS

English Translation of article by Wolter "Influence of Calcium Sulfate Forms and Mixing Time on Setting and Solidification of Cement", Zement-Kalk-Gips, vol. No. 7, Issue No. 42, 1999, pp. 372-375.*
Wolter H: "Einfluss Der Calciumsulfatformen und Der Mischdauer Auf Das Ansteifen und Erstarren Des Zementes", Zement-Kalk-Gips-ZKG, International, Bauverlag BV., Getersloh, DE, vol. 42, No. 7, Jul. 1, 1989, pp. 372-375, XP000036646.
Goswami G et al: "Gypsum Dehydration During Comminution and Its Effect on Cement Properties", Journal of The American Ceramic Society, Blackwell Publishing, Malden, MA,US. vol. 73, No. 3, Mar. 1, 1990, pp. 721-723, XP000141118.
Roy S et al; "Case Study of Rising Cement Mill Temperatures—Incidence of False Set//Studie Zur Temperaturerhoehung in Zement-Muehlen-Auftreten Von Falschem Erstarren//Etude De L'Augmentation De Temperature Dans Des Broyeurs a Climent-Apparition De La Fausse Pris", Zement-Kalk-Gips-ZKG International, Bauverlag BV., Getersloh, DE, vol. 54, No. 4, Jan. 1, 2001, pp. 206-208,XP001091781.
Wirsching Franz: "Calcium Sulfate", Jan. 1, 1985, Ullmann's Encyclopedia of Industrial Chemistry, pp. 555-584, XP008097789.

* cited by examiner

*Primary Examiner* — Anthony J Green
(74) *Attorney, Agent, or Firm* — Gokalp Bayramoglu

(57) ABSTRACT

The Invention is related to increasing of early strength and final strengths of cements classified under EN and ASTM as Portland or CEM cements and also related to all clinker employing cements and to any kinds which employ calcium sulphates for set optimization and is for composing of new cements by only assessing new methods for production and is for composing of new cements by only assessing new methods to formation and inclusion of calcium sulphate resources which are used for set optimization. A new calcium sulphate resource is obtained by employing lower heats and this input is arranged to different dehydration levels at which they can be most efficient for the selected use. These different dehydration levels are called intermediate phases of dehydrate or hemihydrates or called as monohydrate.

6 Claims, No Drawings

LOWER HEAT PROCESSED CALCIUM SULPHATES FOR EARLY STRENGTH CEMENTS AND GENERAL USE

The Invention is related to a specific method of inclusion of calcium sulfates as the main tool of set optimization for cements under standards EN or ASTM and all cements involving clinkers, for attaining exceptional increase in their early strength and also increase in final strengths. New cement product are obtained. Second set of products are new type of gypsums that can be used for all uses where known gypsum are used. And thirdly, by using the new calcium sulphates, it is obtaining of high strength pozzolan lime binders. To begin with the first aspect; Although the activity mechanisms are not clarified fully yet, it is assumed or thought that the calcium sulfates effect the strength development (increase) of cements by affecting the micro structures of the calcium silicate hydrates. What is required in general is introduction of sufficient amount and form (kind) of calcium sulfates for balancing the reactivity of the aluminate phases. In this manner, earlier hydration of silicate phases would be provided and the porosity of the system be decreased.

Cement minerals reactions are related to four minerals; Calcium silicate minerals ($C_3S$ and $C_2S$), Calcium aluminate/Ferite minerals ($C_3A$ ve $C_4AF$) and reactions with additional sulfate ions are to be mentioned. Hydration of sulfates are required basically for limiting formation of ettrengite around $C_3A$ and $C_4AF$ hydration process and prevent cutting of their relation with water. In this manner their reactivity is being reduced (delayed) and permit more of silicate phases attain earlier strength and thus reduce the porosity of the system. Calcium salts provide speeding of calcium silicate phases to gain strengths by reducing the concentration of $Ca(OH)_2$ in the liquid phase of the cement paste and prevents its sedimentation by getting separated from the solution. If an appropriate sulfate hydration could not be provided, following the exhausting of sulfates, the aluminate concentration shall be increasing due to the ongoing hydrations of $C_3A$ and $C_4AF$. The monosulfate in the hardening paste, when combined with sulfate ions, shall be converting to ettrengite and expansion by volume and cracks occurs. Since the solubility of hemihydrates is more, the formation of ettrengite in early stages of hydration gets faster while against this, formation of $C_3A$ slows down. With the decrease of solubility of aluminates in the sulfate bearing conditions, the heat released becomes to decrease down and this stage is the one where sulfates are exhausted and the early strengths are formed or determined. Aluminate phases contribute to early strengths and directly effects final strengths. In the sequence of the time, the main strength developing factor are silicate phases, $C_2S$ shall be developing in time but $C_3S$ hydration rate is apparently higher and provides faster strength formation. Although, the discussion is more concentrated on calcium silicates, it is known that other phases are also important. If verification and disclosing of the existing knowledge be continued on; Calcium sulfates' effects on cement hydration is concentrated on false set and instant set discussions. The prevailing application is inclusion of 3-5% of natural gypsum stones or natural anhydrites and gypsum existing together in nature to the clinkers at defined stage of their grinding process by providing cooling precautions to keep dehydration level at desired amount where some content of hemihydrates and even soluble anhydrite shall be forming which are considered as a part of planning which is thought as controllable. The main measure criteria of the effect have become to be the $SO_3$ quantity (content). An industrial process which received a general acceptance is available also; The calcium sulfate optimization studies consists one the main research areas of the cement sector and involves design of the desired early and final strengths, rheology, workability, set time etc. in nearest to the existing needs. These are similar continuous studies at thousands of cement factories. The parallel and interground obtaining of calcium sulphate resources along with clinker grinding is complex. It is planned that, forming hemihydrates and soluble anhydrites in the hot circumstances of grinding are providing easier soluble sulfates to control the preliminary (early) activities of the aluminates. If suitable arrangements to control water sprays, which are for cooling, could not be obtained false set, early cement hydration, loss in rheology and flowability shall take place and strengths losses might also occur. The formation of 40-50% hemihydrates and soluble anhydrites are accepted as an optimum range. The aim is to attain the calcium sulfate content that shall regulate optimum strengths and drying shrinkage (and expansion), otherwise excess of $SO_3$ causes excess expansions. The cement standards brought limits to maximum quantity (content) of $SO_3$. Although mainly tied to $SO_3$ content, solubility factor is of importance as one of underlying factors about the general acceptances. The hemihydrates and soluble anhydrites has higher solubility and they should be used for this reason. Solubility is also accepted as a measure of reactivity. There is no clear-cut opinion regarding the activity power. On the other hand, there are some expressions that, although hemihydrates and soluble anhydrites are more soluble, they are having less hydration activity compared to natural gypsum stones, ie the latter provides sulfate ions faster than hemihydrates. As was mentioned, the hydration process which involves the calcium sulphates also could not be explained fully. The Invention attempts to contribute to these deficiencies by approaching from observing of behaviors of calcium sulphates themselves as an important considered factor. At each dehydration level, a different calcium sulfate type is being obtained and is having different activity or behavior. Ie the mineral simply mentioned as gypsum, shall provide different clinker calcium sulfate reactions (interactions) for each phase, like humid gypsum stones, dry (2.0 mol. water) gypsum, 1.9, 1.8, 1.7, molecular water gypsum stones. According to existing explanations, the hemihydrates are defined by reducing molecular water to 0.5-0.8. Should we consider the ones over this range as dehydrates while they are showing different characteristics? There are no particles which are not dehydrated in the existing industrial practice. Although we can assume that the clinker can be cooled to some extend and than be ground, the existing scale mills shall still drive the heat to undesired levels. Some mills which do not create excess heat also are available. Still the basic factor is to decide which phase of gypsum stones or anhydrites be chosen for grinding. The invention is providing explanations and new products and new methods to solve and explain the related matters. The Invention's cements provides high early strengths in 1st day which are equivalent or higher to 2 nd day strengths of known factory cements. Even without requiring ultra fineness, at same fineness the very high early strength (ultra) cements can be obtained. In many of the applications, the final strengths are also carried to higher levels. The Invention attains all these by only arranging the introduction of calcium sulfates. With this property, the Invention can be applied to all the known cements and to cements that shall be using calcium sulphates in the future also.

The early strength development factor for cements of nowadays, is becoming to have a crucial importance. This area is a critical optimizations area which is to consider expansion, shrinkage, hydration temperature, compatibility to chemical additives etc. Primarily due to construction of high rise buildings, a dependable and sustainable moulding, pouring, de moulding cycles is required and due to needs of fast production track and mould using of precast sector's systems, having a comfortable flowability, workability and placing, having sufficient work time but providing this without critical expansion or shrinkage and provide exceptional 1 st, $2^{nd}$ and $3^{rd}$ day compressive strengths and continue these in $7^{th}$ and $14^{th}$ days also are needed increasingly in the cement/concrete market. There are different sequences (processes) which requires speed beginning from demoulding to supply transport. The invention proves clearly that calcium sulfates have relation with these speed demanding processes. In the literature there are some statement by few researchers that calcium sulfates may effect early strengths but these are not practically classified or explained for needs of industrial application. When we continue the practical approach, beneath early developing of strengths, contribution to environmental factors are also obvious. With this approach, by reducing the clinker use to some extent, and using higher calcium sulfate contents, the way for attaining highest early strengths is being obtained. According to Inventions findings with these approach, Invention's external humidity dried but 2.0 molecular water bearing gypsum in combination with natural anhydrites grinding seems to be favorable. When existing literature is employed for explaining the matters, some valid aspects are determined; When we examine hydration process of calcium sulfates with water only, it is known that hemihydrates and soluble anhydrites are at least three times more soluble but this capability begins to change while heat begins to approach to 50° c. and over 50° c. the comparative solubility of hemihydrate to dehydrate diminishes. The initiation of heat increase the diffusion rate and rate of reaction also increases. When the heat of mix water exceeds 100° c., reaction cannot proceed and solubility rates of hemihydrates and dehydrate becomes to be equal. We think that this gypsum hydration information involves valid thesis to carry to cement hydration. If sufficient calcium sulphates enough to prevent a permanent instant set, which in practice are being supplied by hemihydrates are available, it is clear that an healthy hydration process had begun. One must be careful that this should not be in an excess not to cause false set or formation of excess ettrengite problems. Knowledge mentions that hemihydrate and soluble anhydrate gets dissolved in the first 60 minutes. On the other hand, high heat calcined anhydrite begins to dissolve after $60^{th}$ minute and natural anhydrite after $24^{th}$ hour. Ie, a good distribution of works (jobs) could be provided. Further, if Inventions calcium sulfates are employed, hemihydrates shall be required in far less amounts. Ie, we can think that with increase of cement hydration heat, sufficient solubility are attained. According to some researchers, at the end, the solubility of gypsum stones and anhydrites are equal in the sense that both of them dissolves but anhydrites dissolves slower and their hydration activity are lower (both rates are thought in parallel) and anhydrite provides 26.5% more of $CaSO_4$ at the end. If we compile the matter, the below explanation can be obtained; In first times (in first 60 minutes) since hemihydrates shall dissolve first, it might be feasible to employ some hemihydrates to prevent instant set. But, if instant set is not present and if your gypsum is providing sufficient solubility, hemihydrates might not be needed. If high heat calcined anhydrates are present in the calcium sulfate system, it is known that they shall be soluble after $60^{th}$ minute. The Invention puts dehydrate gypsum stones to main role and defines them according to their dehydration levels. Dehydrate gypsums also, with effect of hydration heat, shall be dissolving beginning from first hours with increased dissolution rate due to this heat and be sufficient (capable) to complete the process solely in many cases. The assigned anhydrites quantity which shall be dissolving after $24^{th}$ hour shall be aiding to later stages of early strength formation where calcium sulphates needs are apparent also and as such, employs good role for completion of later stages of early strength formation. As a result, the main role in hydration driving is on dehydrate and hemihydrate and natural anhydrite has partial roles. Another important finding of the Invention is that monohydrate gypsums has capabilities to substitute dehydrate gypsums for hydrations that shall also provide high early strengths. Further, monohydrates are more economical solutions by substituting hemihydrates when such use are employed. As such, the Invention's findings and existing knowledge are being considered and interpreted to be combined for support of explanations. As expressed by many cement chemist Scientists, the area of effect of calcium sulfates to strengths is a complex area. Although the calcium sulphates might affect the hydration rate, the more probable fundamentally is strength changes (differences) observed are for differences in binding capabilities of hydrates that are formed. The invention explains how use of calcium sulfates methods directly effects cement hydration and effects development of strengths. The existing scientific insufficiency or grayness about activity power is being clarified. Gypsum, hemihydrate and anhydrate are being processed (obtained) according to known applications. According to be Invention, the gypsum concept is special an area defined insufficiently. This random gypsum (or hydrated calcium sulfate) concept were consisting of many gypsums which changed characteristics and having various kinds that are out of control and sustainability in definition and this makes the matter complex and difficult to be explained. Although some sufficient compressive strength under these conditions also are obtained, they are never close to Invention's results. In the same manner, the hemihydrates also can be defined according to their molecular water levels left and they also have differences. For arranging optimum gypsum content studies, the main difficulty is that you are against countless gypsums. For this reason, the matter has been left to practical approaches till to this time.

The calcium sulfate resources simply defined as gypsum stones and are evaluated basically according to their $SO_3$ level and solubility and impurities and their other properties were not evaluated in depth forms the core of the Invention which specifies different behaviors according to different dehydration levels and based on these explains how new cements products be obtained. According to Invention, the effect of calcium sulfates to cement hydration and high strength development is crucial. This is provided by dehydrates, monohydrate and hemihydrates. When especially $1^{st}$ and $2^{nd}$ day compressive strengths are considered, strengths obtained by dehydrates, monohydrates and hemihydrates dehydrated in a certain manner, cannot be attained by other known gypsum stones. In context of the Invention, many experiments has been performed. In these experiments, as aggregates, the 0-5 mm size random quarry calcium carbonate stones has been used. In all experiments cement dosage has been 450 kg/m³ and water cement ratio 0.37-0.40 has been employed. Cements and clinkers from different factories has been tested. To explain results with concrete examples; When a 42.5 R cement of certain factory is compared with Invention's cement made with clinker of that specific cement as ground to same fineness, the $2^{nd}$ day compressive strengths in the previous were 20-22 Mpa while the latter attained 29-32 Mpa. No chemicals or grinding aids has been employed at their formation. When Invention's cements in tests are explained; The external humidity dried and not dehydrated gypsum stones are them being ground and blended. Effect of every dehydration level is being felt; Heat at which dehydration was realized were considerably lower than the known practices, different lower heat levels has been tested. Many dehydration stages has been tested and worked in parallel with heat factor. These aspects shall be explained in the following sections. Different factories' clinkers has been employed and much higher early strengths than that of their own ready to use 42.5 R cements. The Invention's cements attained comparatively apparently high 1 st day strengths that might go to 25 Mpa samples. With Invention's cements the 2 nd day of factory 42.5 R cement's strengths are being attained or surpassed in many samples only in the $1^{st}$ day. It is obvious that this capability shall provide cost decrease and speed increase for all uses. Later dates compressive strengths also has been measured and although the difference is being diminishing it was clear that the Invention cements yielded clearly higher compressive strengths. These, which could be called as main intermediate phases, the other intermediate phases also attains higher results compared to factory cements although not as much as the previous and all are favorable to the factory brands.

The Invention finds out that external (initial) humidity of the gypsum stone raw material has crucial effect on the reaction quality of the final calcium sulphate input to be blended with the clinker. When ground after drying of the external humidity, the reaction capability of the gypsum (calcium sulphate source) considerably increases. The external humidity should be decreased to zero preferably or at least to around 1% prior to grinding process for obtaining a capable calcium sulphate source. At each increase of humidity by 0.2%, by weight, a measurable decrease in compressive strength has been observed. The natural gypsum raw material were ground to the same fineness to that of Portland cement 42.5 R brands. The Invention claims that, drying and dehydration of molecular water in a dense and high heat mill and dehydration of molecular water of already dried gypsum stones in a less heat mill circumstance yields different products, the latter being more beneficial for hydration of the cement process. Reducing or deriving out of the external humidity prior to grindings being a very a favorable instrument, further dehydration in a controllable manner yields also different products. A 1% by weight loss of molecular water is positive, further stages are also studied in detail. After 2-2.5% loss a gray area is arrived, where strengths might show a decrease.

The fundamental approach of the Invention is based on evaluation of different calcium sulphate resources according to their reactivity power which are attained depending on their dehydration level under lower heat conditions. Findings are verified with XRD measurements. Experiments are performed with employment of lower optimum calcium sulfate and $SO_3$ rates while this permits to obtain higher first day and early compressive strengths. These calcium sulfate products are produced by heating gypsum stones under different heats and heating periods and ground to 3500-4000 blaine at a fixed grinding time. The samples were heated under 105° c. generally and their external humidity were derived and ground. Depending on batch quantity, aggregate particle size, mixing conditions the chosen grinding process, heat formation and circumstance caused 2%-2.5% molecular water loss by weight (loss of 10-13 of molecular water) from the dried, humidity free dehydrate. The XRD measurements of these products yielded 16%-25% of hemihydrates proportion. The cement which are reaching to highest early compressive strengths are obtained by calcium sulphate product, as above, which have 21%-26% hemihydrates. This XRD reading hemihydrates rater were over the calculative water loss results measured physically. At an additional 0.70% dehydration level, this XRD reading and physical calculation difference continued on in a decreasing manner. The compressive strengths obtained with cement using this phase product were higher than that of market Portland cements but less than the previous case of Invention's cement. A further step of dehydration by weight of 0.5%-0.7, the getting closer XRD reading and physical calculation difference increases again and these calcium sulphate product using cement yields higher strengths than the previous which are very close the first case (with 5-10% only). The XRD measure hemihydrates rate is 33%-35%. The optimum calcium sulphate inclusion rate also increased by 4-5%. At following further dehydration levels, the XRD readings and calculation values gets again closer and hemihydrates rate has been read at 40%-50% range. With these calcium sulphate products, previous compressive could not be attained again. The highest compressive strengths are obtained with products at which first high XRD reading difference has been registered where hemihydrates rate was 21%-26% range and second high difference range was 30-34% hemihydrates forming phase. These products are named by us as dehydrate intermediate phases or intermediate phases of dehydrate. A second range of gypsum stone originated calcium sulfate resource is when XRD hemihydrates rate begins to get close to 60% range. Here also, the hemihydrates XRD reading is in excess of that of calculation result on physical molecular water loss. The marginal difference is smaller than that of the first mentioned dehydrate case. This point is what we call as 1.20 molecular water dehydrate phase towards monohydrate phase. Monohydrate phase (molecular water 1.00) as named by us, is suitable for forming high compressive strength cement in a notable manner and hemihydrate as per XRD is around 70% and is still higher than physical water loss, although difference is in decreasing trend. When hemihydrate phase is beginning to be formed at around XRD readings of 78% hemihydrate (hemihydrates 0.90 molecular water) begins to get close to physical loss and when readings come to % 80 range they become equal to each other. This point is what we nominate as 0.80 molecular water hemihydrate phase. Till this point optimum minimum inclusion rate of calcium sulphate resources as per the Invention was in the same range but following this point, inclusion rates has dropped down. In a different manner, from this point on XRD reading hemihydrate rates are lower than that of physical water lost calculation. When we came to 0.5 molecular water hemihydrate, this difference in reading becomes more apparent. Hemihydrates is 89%, soluble anhydrite 6% and dehydrate 2%. When dehydration is continued on at the same heat level, 47% soluble anhydrite is formed, hemihydrate lowers down to 28% and dehydrate climbs to 23%. This is a similar structure to that of natural anhydrite stones. It a point that XRD reading difference becomes minimal. When the same dehydration level is repeated with 170° c., similar proportioned formation is obtained for the 0.5 molecular water hemihydrate. But since water loss is higher, it is obvious that reading difference gets bigger comparatively. When the matter is considered against strength development capability, the first instant and high jump in reading difference are the products to obtain highest strengths. Then follows a low area till the second jump point where good result are again began to be obtained. Following this point there are high strength obtaining products. After a point XRD reading difference disappear and XRD shows less hemihydrates than the physical molecular water loss. With these also good results could be obtained. But after a jump point where this difference becomes apparent, (over dehydrated) products does not yield good products. Products, whose external humidity are dried and a further dehydration of 1.5%-2.0% has been realized and nominated as 1.75-1.80 molecular water product and 3.0%-3.5% dehydrated around 1.63 molecular water products are the most efficient and economic options. This is followed by further dehydrated products beginning from 1.20 molecular water and down. With a detailed scientific study, all theoretical options and phases could be worked out. It is important to notice that, the 40-50 hemihydrate rate which is deemed optimum at the prevailing practice is remain at the no efficient range.

When dehydration heat, dehydration level, heating process time, granular size distribution of heated material be considered, preliminary finding was that, at 90-120° c. range products those reactivity power were high being obtained. But, for larger scale operations the comparatively lower heat 90-100° c. operations might require excess of time and yield much more hemihydrates proportion at XRD compared to that of 105° c.-120° c. processed ones and as such they cannot be effective in cement hydration process. At low heats industrial process forming becomes very difficult and results might not be appropriate also. For very high dehydration levels also similar problems occurs. For product which require slightly less dehydration higher heats up to 135° c. gives good results. For high level of dehydrations this heat might be excessive also. Heat increase after 1% of dehydration level control difficulties might occur. Heating process is performed in longer times generally and heats mentioned becomes as product heats. Even in case of drying of external humidity only, excess heat levels prevents formation of the needed molecular structure. Lower heat and longer process period provides the formation of the needed molecular structure. With any of the products which were obtained at high 170° c. heat level were successful like lower heat processed products. At the higher heat processed products, for the same fixed grinding time, particle size gets more finer due to scattering of particular crystal, structure and unit volume gets bigger. Over 135° c., this effects are observed and gets more clear as heat level increase. According to existing literature, this kind of structurally broken products shall have higher reactivity, as reactivity is measured parallel or with the heat level of the reaction. But these products cannot obtain the high compressive strength levels which are obtained by non scattered (fractured) structure products. The Invention assign a reactivity power concept. If explained with experiment performed; the of calcium sulphate products obtained under 105° c. either in dehydrate or hemihydrates class, all are in same unit volume and weight. But at further dehydration fracturation of crystals begins and volume increases. At 135° c. operations some fracturation might begin earlier manner and increasing as dehydration level increases. At higher heats of 170° c., this becomes more apparent. The products which were ground firstly and than dehydrated followingly, might show structural change and volumetric increase compared to gypsum stone aggregate first dehydrated to a level and than be ground. This is result of expansions, surface enlargement, and fracturation Regarding particular size. Another observation is that, when humid gypsum stones are ground at the some time period of the dried gypsum stones, a much finer particular size distribution is obtained. For attaining the similar distribution, a grinding time which is 20-25% less is required. This is due to grinding Characteristics of humid stones and due crystal fracturation of humid product. Although at drying of humid stones under lower heats only drying of external humidity is aimed and planned, some unavoidable hemihydrates formation occurs. For example if drying of external humidity of 2.5% is done with 90° c. heat at a very long time, an hemihydrates level reaching to 40% might be obtained and the desired intermediate calcium sulphate phase might not be attained. When 105° c. is chosen this gets quarenteed and desined reactivity power shall be obtained and hemihydrates level shall be at twenties. Exact same operation be done under 135° c., the hemihydrate level shall reach to 25%. range and the reactivity power is very close to the previous. At over 140° c. even at only drying purpose operations the volumetric increase and reactivity power loss becomes apparent. The heat of grinding operation should paralely be calculated. For grinding operation, the elimination or decrease of external humidity is important and least obtaining 1-1.5% humidity level shall be of a minimum necessity. It is preferable not to develop very high heats of grinding and keep dehydration level at grinding phase in range of 2%-3%. As such, needed reactivity powered products be obtained. The Inventions calcium sulphate resources can be used for attaining highest early compressive strength development with low inclusion rates to clinker or at higher rates for economical and environmental reasons.

Invention's calcium sulphate resources obtained under 105° c. heat as a 45-50% dehydrated one and as a 60-70% one were analyzed under TGA/DTA analysis. As expected; the higher dehydrated ones passes form (phase) changes at shorter time and at lower heats (123° c.-133° c.) and the second form change occurs at similar heats like 190° c. for both. The weight loss mostly occurs till 200° c. be reached and this loss begins mainly from 90° c.-110° c. on. These are comparatively faster processes and are in coincidence with Invention's findings The Ankara region (Gölbasi-Bala- Kochisar) 4-8% impurity bearing gypsum stones which are also being used by many cement factories has been used in experiments and the Denizli region 7-8% impurity gypsum stones has been employed as control. Each gypsum kind were ground to similar fineness to that of cements. The clinkers of Nuh Cement Factory at Hereke has been employed but other clinkers has been also employed as controls (Limak/Ankara, Akçansa, Denizli) and general character of the findings were verified. Each gypsum phase formed, ie each dehydration level of calcium sulfate has been tested for finding optimum contents to attain highest early strengths. It was found out that, these optimums were quite sensitive to alterations and even at ±3% measurable changes in strengths were occurring. In case of use of a sole gypsum source, these optimum content rates were found as 10-30% lower than that of fabricated cements. These cements could not obtain their nominated strength values with low gypsum inclusion, while Invention's cements can work with a wider range of calcium sulphate resources inclusion rate. The minimum optimum rate of inclusion of natural gypsum stones treated and ground as per the Invention were 3.75% in general for most of the dehydrate weightage (high dehydrate content products, in some cases this was 3.85%. For hemihydrate weightage products inclusion rate to clinker was 3.40-3.45% and in some cases 3.30-3.35%. These figures puts the prevailing $SO_3$ content knowledge to a questionable position. Although early strengths were considered more importance, the samples which could not attain final strengths of fabricated cements were not considered.

The Invention defines all the calcium sulphate resources according to their dehydration levels and according to the molecular water left as the result of dehydration heating and grinding. Heat level is a low heat range but heat level also can be specified along with molecular water. As such, dehydrates begin from 2.0 molecular water and are down to 1.20 to 1.00 molecular range. This range, we nominate as monohydrate range, which is and efficient phase also for calcium sulphate needs of clinkers. Below this are hemihydrates. We also nominate hemihydrates with their molecular waters. Similar to dehydrates, there are many intermediate hemihydrate phases also. Efficient range for cement are 0.70-0.90 range generally.

Due to cost considerations and/or environmental considerations, it might be preferable to include higher percents of gypsums to clinker. The Invention's cements are capable in this. Higher inclusion similar to that of many factoric like 5% is possible with a very slight decrease in early strengths. Further, inclusion of natural anhydrites to the calcium sulphates portion is possible as some simple samples are given followingly; With 3.5% dehydrate+0.75 natural anhydrite 1 st day 24 Mpa, $2^{nd}$ day 28 Mpa ($\Sigma$4.25%), 3.25% dehydrate+ 1.5% natural anhydrite 1st day 21 Mpa, $2^{nd}$ day 27 Mpa ($\Sigma$ % 4.75), % 3.3. dehydrate+1.3% natural anhydrite 1 st day 21, 2 nd day 26 Mpa can be stated. Inclusion of hemihydrate phases creates other opportunities like 0.75% 0.70 molecular water hemihydrates+2.45% dehydrate+1.65% natural anhydrite 1 st day 21 and $2^{nd}$ day 30 Mpa ($\Sigma$4.85%), 0.75% hemihydrates with 0.80 molecular water+2.35% dehydrate+ 1.95% natural anhydrite yields day 22 and $2^{nd}$ day 30.5 Mpa ($\Sigma$5.05%). The use of hemihydrates of the Invention as majority $CaSO_4$ source with natural anhydrites also produces good results; % 3.2 0.70 molecular water hemihydrate +0.9% natural anhydrite gives 1st day 21 and second day 29 Mpa ($\Sigma$4.1%) Many better alternatives can be obtained. Beneath natural anhydrites the anhydrites produced under high heat also gives favorable aid. These are products calcined at 450° c.-500° c. and 850° c.-100° c. and variations of them treated with alum or borax or others to become to be Keene Cement, Martins Cements and the like, Invention finds out that use of these products solely or in combination with other calcium sulphate resources produces very high early strength cements. Eg; 3.5% dehydrate+0.75% 450° c.-550° c. calcined anhydrite gives $1^{st}$ day 20.5 Mpa and $2^{nd}$ day 28 Mpa ($\Sigma$4.25%), 3.35% dehydrate+1% same anhydrite $1^{st}$ day 24 Mpa and $2^{nd}$ day 30 Mpa ($\Sigma$4.35%) Higher calcium sulphate inclusion also is possible, Eg; 3% dehydrate+2% calcined anhydrite gives 2 nd day 29.5 Mpa ($\Sigma$5.0%). The sole use of same anhydrate as 5% fields 30.5 Mpa 2 nd strength. By inclusion of Inventions hemihydrates or monohydrates different early strength cements can be obtained. All the Invention's cements mentioned till now, either obtain at least same final strengths obtained by same class same clinker factory cements or are higher many times and in some cases slightly lower. In short, the Invention provides considerably high early strengths with high final strengths also. While providing this major step, the Invention finds also ways for higher calcium sulphate inclusion to clinkers.

When calcium sulphate contents are considered, the anhydrite has 26.5% more $CaSO_4$ compared to the dehydrate and with use of the latter, 3.75% optimum inclusion of a gypsum stone source with 7% impurity is registered, which means 2.48% $CaSO_4$, and in an extreme example the same source but calcined anhydrite is included as 5% which means 4.65% $CaSO_4$. The inclusion of $CaSO_4$ can be doubled. Variation in $SO_3$ level also is parallel and varies in between 1.15% to 2.46%, ie difference is more than twice. The Invention proves that $SO_3$ inclusion content (ratio) is not the main actor to determine the level of $SO_3$ in total with that of included in the clinker. As a major factor of set management. The lowest rate is care taking as the one providing the highest early strength and this level is lower than the known practices. Not same but very close to this, high compressive early strengths can be obtained with inclusion of double content of $SO_3$. As a result, we can say that there is not exact correlation between $SO_3$ level and early strength gaining. The existing knowledge which specifies $SO_3$ content to be formed as 0.6 of molecular mass of $Al_2O_3$, seems to be remained non based in general. The existing solubility reactivity or reactivity power explanations also are remained insufficient. Invention finds that major effect is provided with chosen phases of calcium sulphates in arranging the cement hydration process. Ie, the Invention specifies and explains the sources of activity powers of calcium sulphate resources. The literature based on or effected from the prevailing industrial practices seem to be reconsidered again. It is also obvious that considerable decreases seems in $SO_3$ levels, stops the expansions also. The basic factor for set management is not matter of $SO_3$ management but managing the intermediate phase character of the gypsum stone to attain the highest reactivity power which is measured by the compressive strength provided by that phase.

When the matter of inclusion of other constituents to the clinker is considered, the ground calcareous (calcite) minerals (calcium carbonates) in range of 5% takes the first attention. The effect as such on compressive strengths has been tested on Invention's cements also by employing (–) 10 microns calcite and 3 to 5% range has been found appropriate. By employing 4% ie by substituting 4% of the Invention's cements by 4% and by using 3.75% of Invention's dehydrate cement it was found out that the existing compressive strengths has been improved further and $1^{st}$ day was 5%, $2^{nd}$ day 3%, $4^{th}$ day 3% and 28 th day was 5-8% additionally stronger. On the other side, since it has correcting effect on negative environmental and cost conditions, it was found as a net gain. For inclusions exceeding 6% positive effect begins to diminish clearly. For cements including anhydrites beneath the major calcium sulphate dehydrates of the Invention, the results were parallel. But when hemihydrates were included to the calcium sulphates portion, different observation begin to emerge. When hemihydrate 0.80 was included as 10% to dehydrate (substituted) the compressive strengths were decreasing. In case of 4% of micronized calcite inclusion this decrease became more apparent. Or, when 0.90% hemihydrate 0.80+2.0% dehydrate+2.4% natural anhydrate bearing calcium sulphate bearing cement formulation, when included with 4% similar filler, the 21.9 Mpa 1 st day strength dropped to 19.7 and 27 mpa $2^{nd}$ day to 26.5 Mpa. Anhydrate inclusion slows a bit this negative trend. This is an interesting and important case, while it was seen that inclusion of hemihydrate does not contribute much, it is shown also that fine (–10 micron) calcium carbonate to and it has a reaction during hydration. The probable reason is, it causes the calcium hydroxide in the cement paste to increase their concentration and get separated from the solution and get settled. Although the same effect prevails in a diminishing manner with the increase of hemihydrate rate to an extend, the diminishing negative effect could be explained by excess loading of calcium sulphate becomes able to make some extend of a stabilization and arrangement. This findings could have implication to the prevailing industrial practices which uses excessive hemihydrate along with 5% ground calcareous stone generally. Inclusion of anhydrites decrease the negative effect. All the experiments mentioned till now, has been implemented by employing clinker of various factories and although values were differing; obviously the compressive early strengths obtained with Inventions application were higher clearly for all the cases.

Invention's cements attains their very high early compressive strengths in moderate hydration heat creating conditions and expansion and shrinkage. The set beginning and end are normal in limits to known cements. In the cements where $SO_3$ level are lower than known also, expansions are easily in limits. Although critically reduced $SO_3$ is introduced, the high and critical expansion expected by the existing knowledge do not take place. These are important advantages. Indeed, standards do limit the $SO_3$ maximum level. All the effects created by inclusion of activators, water cutters (reducers), chemical additives pozzolanas, fillers etc are tested on the inventions cements and no further effect to that of known cements were obtained, as was expected. The cement particle size effect studies are parallel to this. The effects on strengths interground gypsum getting very fine size and constituting the finest part of that gypsum were compared with the ground separately to the cement size gypsum yields better strengths. As such Invention is remedying another deficiency of existing system also. When clinkers are ground finer, parallel results to that of known cements obtained and higher strengths were obtained. Water requirement of the new cements were lower than the brand factory cements. This also aided to decrease porosity and increased strength When examined from industrial view, it is clear that the targets and methods can be realized by employing the known industrial methods. The first necessity is that heat level should not be high to cause fast or excess dehydration of gypsum stones. Many kinds of heating processes can be employed, including the flash heating. For an appropriate heating, a homogeneous particle size shall be preferable, where particle size of the mix shall not be mixed as very big size and very small particles. The ground and cool gypsum resources can be blended with cooled clinker with any of the dozing, weighing, mechanical missing methods. In special mills which do not create excess heat, the interblending can be realized. But in this choice one must be aware that gypsum particle size shall be much finer to form finest portions of the cement mix. If particle size is important, separate grinding shall be needed. Even the gypsum stones shall be ground separately, the mill is to be organized not to cause excess fast dehydration. Since the gypsum portion of cements are in range of 3-6%, large scale mills would not be required. Economical operations can be arranged by providing gypsum needed in ground form from specifically scaled, special plants and in cooler form. Intergrinding where clinkers are sufficiently cooled can also be employed. Clinkers and calcium sulphate (gypsum) portions can be supplied in two components to be mixed in concrete ready mix plants. As a result, a set of most flexible alternatives can be designed for choosing the most appropriate.

The Invention is in capability practically to solve the mixed up practices mostly based on its own practices only by explaining, revising the underlaying previous knowledge. The planning and calculations becomes to be practically and easily managed. Further, the Invention's findings are explanatory to structures and phases and behaviors of calcium sulphates, it becomes easier to employ them in uses or industries other than the cement sector by just bringing solutions founded over basic findings.

The new calcium sulphate resources of the Invention can be employed for another use, as a second stage of the Invention; Strengthening of the pozzolan-quicklime binders. The Inventor have another. Invention related to direct use of quicklime in an increased proportion with pozzolan (s) for obtaining of economic and environmental friendly pozzo lime binders which yield early strengths practical to be used in many application and final strengths that shall be sufficient for many of applications which does not require structural strengths, like mortars, fillers, low rise simple buildings, block making, lean concrete, etc. Early strength are quite sufficient. These are high content pozzolan(s) involving binders. A very typical sample is tras 76.5%+ quicklime 22%+1.5% Inventions's new calcium sulphate involving % 87 hemihydrate and having molecular water of 0.80 range. Strengths are 10.7 Mpa at $07^{th}$ day and 15.3 Mpa at $28^{th}$ day. Another version at 0.90 molecular water attains to 12.1 7 day and 17 Mpa for $28^{th}$ day. When polycarboxylate type extender/water cutter be used $7^{th}$ day is 14.2 Mpa and $28^{th}$ day 23.5 Mpa. With and of NaOH activator $28^{th}$ day goes to 25 Mpa. These are very high figures sufficient enough to make a product as market usable. One can easily remember that, most of the structural works till 30 years age were performed with 22.5 Mpa concretes. The UN Habitat states that 50-60% of the works in which Portland cements are used does not require the structural strengths given by those cements. While this is the case, the Portland cement industry, solely, is responsible for 7-8% of the world's $CO_2$ emission. It should be noted that new calcium sulphates can be used for many of the pozzo quicklime/pozzo-lime cements also in many different formulae.

The other use of Invention's calcium sulfates are in the area of calcium sulphate binders. They can be used for any work where market type hemihydrates are used. The usable ones are more hemihydrates content involving ones beginning from monohydrate range. Their difference from market products are that they are requiring more water for their hydration, being in a more aggressive characters (fast setting-high heat). This shall provide obtainament of more product by use of more water. The porosity enlarges the product volume and less of calcium sulphase base products be used. These are durable and strong products like market hemihydrates. It is possible to obtain stranger products by involving of suitable water cutter additives to decrease porosity and increase density. Further, since these products were not dehydrated to the extent of 0.5-0.55 molecular water of the marketed products, it is obvious that less energy shall be used for the same quantity of product and less raw material for same volume be needed. When products dehydrated at 170° c. to same dehydration are considered; they are not as useful. The applicable new products are more stronger. They can be used for substituting alpha gypsum and type II high heat dehydrated anhydrates partially of fully. With these new calcium sulphate binders all the applications that could be performed by the known calcium sulphate ducts can be performed (casting, sheets, screed, render, etc . . . ). All the known techniques of production can be applicable to the new, products also.

The invention claimed is:

1. A method for attaining a strength enhanced pozzolan lime involving cement, the method comprising:
adding a plurality of calcium sulfate compounds to a plurality of pozzolan, lime and clinker; and
dehydrating the calcium sulfate compounds under a temperature ranged from 90° C. to 145° C.

2. The method of claim 1, wherein the temperature ranges from 105° C. to 135° C.

3. The method of claim 1, wherein the temperature ranges from 90° C. to 120° C.

4. A method for attaining a strength enhanced cement, the method comprising:
   adding a gypsum to a clinker;
   dehydrating the gypsum under a temperature ranged from 90° C. to 145° C.;
   dehydrating the gypsum utilizing heat;
   grinding the gypsum to powder; and
   blending the gypsum with a cooled ground clinker.

5. The method according to claim 4, wherein an anhydrite is formed after dehydrating the calcium sulfate compounds.

6. The method according to claim 4, wherein the dehydration level is increased towards a hemihydrate level to obtain a general purpose hemihydrate product.

\* \* \* \* \*